US009999012B2

United States Patent
Xu et al.

(10) Patent No.: US 9,999,012 B2
(45) Date of Patent: Jun. 12, 2018

(54) METHOD AND DEVICE IN WIRELESS COMMUNICATION SYSTEM

(71) Applicant: Sony Corporation, Tokyo (JP)

(72) Inventors: Xiaodong Xu, Beijing (CN); Qimei Cui, Beijing (CN); Yu Sun, Beijing (CN); Ningyu Chen, Beijing (CN); Rui Gao, Beijing (CN); Jiahui Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 237 days.

(21) Appl. No.: 14/693,053

(22) Filed: Apr. 22, 2015

(65) Prior Publication Data
US 2015/0327202 A1   Nov. 12, 2015

(30) Foreign Application Priority Data

May 8, 2014  (CN) .......................... 2014 1 0193148

(51) Int. Cl.
*H04W 56/00* (2009.01)
*H04L 5/14* (2006.01)

(52) U.S. Cl.
CPC ......... *H04W 56/002* (2013.01); *H04L 5/1469* (2013.01); *H04W 56/0015* (2013.01)

(58) Field of Classification Search
CPC .................. H04W 56/0015; H04L 5/1469
USPC ................................................ 370/310–350
See application file for complete search history.

(56) References Cited

U.S. PATENT DOCUMENTS

| 2012/0099505 A1* | 4/2012 | Wang | H04W 72/005 370/312 |
| 2012/0224533 A1* | 9/2012 | Lin | H04W 56/002 370/328 |
| 2013/0272170 A1* | 10/2013 | Chatterjee | H04W 28/02 370/280 |
| 2015/0173033 A1* | 6/2015 | Wu | H04W 56/0015 370/328 |

* cited by examiner

*Primary Examiner* — Chandrahas B Patel
(74) *Attorney, Agent, or Firm* — Oblon, McClelland, Maier & Neustadt, L.L.P.

(57) ABSTRACT

There is provided a method and device in a wireless communication system, the method comprising: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position. According to the disclosure, it is possible to realize synchronization among cells belonging to different operators and/or adopting different synchronizing manners.

20 Claims, 14 Drawing Sheets

| TDD configuration #2 | subframe0 | subframe1 | subframe2 | subframe3 | subframe4 | subframe5 | subframe6 | subframe7 | subframe8 | subframe9 |
|---|---|---|---|---|---|---|---|---|---|---|
| cell A | D | S | U | MBSFN CRS | D | D | S | U | D | D |
| cell B | D | S | U | MBSFN listening | D | D | S | U | D | D |
| cell C | D | S | U | D | D | D | S | U | MBSFN CRS | D | operator 1: { cell A, cell B } operator 2: { cell C }

FIG. 3

| TDD configuration #2 | subframe0 | subframe1 | subframe2 | subframe3 | subframe4 | subframe5 | subframe6 | subframe7 | subframe8 | subframe9 |
|---|---|---|---|---|---|---|---|---|---|---|
| operator1 { cell A | D | S | U | MBSFN CRS | D | D | S | U | D | D |
| operator1 { cell B | D | S | U | MBSFN listening | D | D | S | U | D | D |
| operator2 { cell C | D | S | U | MBSFN CRS | D | D | S | U | MBSFN listening | D |

FIG. 5

| TDD configuration #2 | subframe0 | subframe1 | subframe 2 | subframe3 | subframe4 | subframe5 | subframe6 | subframe7 | subframe8 | subframe9 |
|---|---|---|---|---|---|---|---|---|---|---|
| | D | S | U | D | D | D | S | U | D | D |
| operator1 { cell A | D | S | U | MBSFN CRS | MBSFN CRS | D | S | U | D | D |
| operator1 { cell B | D | S | U | MBSFN listening | D | D | S | U | D | D |
| operator2 { cell C | D | S | U | MBSFN CRS | MBSFN listening | D | S | U | MBSFN listening | D |

FIG. 6

| TDD configuration #2 | | subframe0 | subframe1 | subframe 2 | subframe3 | subframe4 | subframe5 | subframe6 | subframe7 | subframe8 | subframe9 |
|---|---|---|---|---|---|---|---|---|---|---|---|
| operator1 | cell A | D | S | U | D | D | D | S | U | D | D |
| | cell B | D | S | U | MBSFN CRS | MBSFN listening | D | S | U | D | D |
| | cell C | D | S | U | MBSFN listening | D | D | S | U | D | D |
| operator2 | cell C | D | S | U | MBSFN CRS | D | D | S | U | MBSFN listening | D |

FIG. 7

METHOD AND DEVICE IN WIRELESS COMMUNICATION SYSTEM

FIELD OF THE INVENTION

The present disclosure relates to the field of wireless communication technology, and particularly, to a method and device for inter-cell synchronization in a heterogeneous network.

BACKGROUND OF THE INVENTION

Continuous Time Division Duplexing (TDD) frequency spectrums may be allocated to different operators, especially for high frequency ranges for example 2.6 GHz and 3.5 GHz which quite might be used in small cells. In such case, an issue of synchronization among cells belonging to different operators becomes especially important, since different operators dispose cells in a same frequency range and in a same geographic area, serious interference among these cells might be caused if there is no synchronization thereamong, thereby degrading network performance thereof.

Further, for the same operator, possibly due to problems of apparatus manufactures, cells disposed in the same area adopt different synchronizing manners, thereby generating synchronization problems, or synchronization errors among cell clusters go beyond a prescribed range or the like, which may generate interference, thereby influencing the network performance.

SUMMARY OF THE INVENTION

A brief summary of the disclosure will be given below to provide basic understanding of some aspects of the disclosure. However, it shall be appreciated that this summary is neither exhaustively descriptive of the disclosure nor intended to define essential or important components or the scope of the disclosure but is merely for the purpose of presenting some concepts of the disclosure in a simplified form and hereby acts as a preamble of more detailed descriptions which will be presented later.

In view of the above circumstances, an object of the present disclosure is to provide a method and device in a wireless communication system for synchronization among cells belonging to different operators and/or adopting different synchronizing manners in a scene of heterogeneous network. Further, the solution described in the present disclosure also applies to solve a synchronization problem between other two cell clusters, for example, a synchronization problem among apparatuses produced by different manufactures and disposed by the same operator or a synchronization problem caused by a large time error between neighboring cell clusters. Since the synchronization issue among cells of different operators is most typical, synchronization among the cells of different operators will be explained by way of example, but the present technology is not limited thereto.

In 3GPP RAN1 #74 R1-133919, it is mentioned that there are two methods to solve the synchronization problem among cells of different operators:
 1) Synchronization is performed using network listening. This method requires cell of different operators to interact information with each other, for example, indications of cell stratum levels, period configuration of network listening or the like.
 2) Different operators perform synchronization with reference to the same absolute clock and ensure synchronization accuracy within their own networks. However, this method might influence synchronization requirements in RAN4.

The present disclosure studies the network listening method described in item 1), and enables cells of different operators and/or cells adopting different synchronizing manners to realize synchronization in such manner.

According to an aspect of the disclosure, there is provided a method in a wireless communication system, the method including: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position.

According to a preferred embodiment of the disclosure, in the synchronization information interacting step, the source cell first sends information indicating a position of a synchronization subframe and a radio frame having been used for sending a synchronization signal by the source cell to the target cell, the target cell feeds back according to its own configuration condition, thereby determining the synchronization subframe position configurable for both the source cell and the target cell.

According to another preferred embodiment of the disclosure, if the position of the synchronization subframe and the radio frame having been used for sending the synchronization signal by the source cell is available in the target cell, the target cell returns information indicating this position is available and configures a synchronization subframe at this position to listen to the synchronization signal from the source cell; and if the position of the synchronization subframe and the radio frame having been used for sending the synchronization signal by the source cell is unavailable in the target cell, the target cell feeds back information indicating a subframe position available for itself to the source cell, the source cell determines the synchronization subframe position configurable for both the source cell and the target cell according the fed back information and its own configuration condition and sends information indicating the synchronization subframe position to the target cell.

According to another preferred embodiment of the disclosure, in a case that the position of the synchronization subframe and the radio frame having been used for sending the synchronization signal by the source cell is unavailable in the target cell, the source cell determines the synchronization subframe position according to feedback of the target cell and its own configuration condition in the following way: (a) if there exists another subframe used for sending a synchronization signal in the radio frame having been used for sending the synchronization signal by the source cell while a position of this subframe is available in the target cell, then determining the position of this subframe as the synchronization subframe position; (b) in a case that (a) does not hold true, if a special subframe in the radio frame having been used for sending the synchronization signal by the source cell is available, then determining a position of the special subframe as the synchronization subframe position; (c) in a case that (a) and (b) do not hold true, randomly selecting one from subframe positions available for both the source cell and the target cell as the synchronization subframe position; and (d) if there exists no synchronization subframe position configurable for both the source cell and the target cell in the radio frame having been used for sending the synchronization signal by the source cell, then repeating operations in (a) to (c) to continue searching in next radio frame.

According to another preferred embodiment of the disclosure, in the synchronization information interacting step, the source cell further sends information indicating a position of a synchronization subframe and a radio frame available for the source cell to the target cell, the target cell determines the synchronization subframe position configurable for both the source cell and the target cell according to the information indicating the position of the synchronization subframe and the radio frame available for the source cell and its own configuration condition and sends information indicating the synchronization subframe position to the source cell.

According to another preferred embodiment of the disclosure, the target cell determines the synchronization subframe position according to the information from the source cell and its own configuration condition in the following way: (a) if the position of the synchronization subframe and the radio frame having been used for sending the synchronization signal by the source cell is available in the target cell, then determining this position as the synchronization subframe position; (b) in a case that (a) does not hold true, if a special subframe in the radio frame having been used for sending the synchronization signal by the source cell is available, then determining a position of the special subframe as the synchronization subframe position; (c) in a case that (a) and (b) do not hold true, randomly selecting one from subframe positions available for both the source cell and the target cell as the synchronization subframe position; and (d) if there exists no synchronization subframe position configurable for both the source cell and the target cell in the radio frame having been used for sending the synchronization signal by the source cell, then repeating operations in (a) to (c) to continue searching in next radio frame.

According to another preferred embodiment of the disclosure, in the symbol-level synchronizing step, synchronization is performed in a special subframe-based manner or in a Multimedia Broadcast Single Frequency Network (MBSFN) subframe-based manner.

According to another preferred embodiment of the disclosure, in a case that the synchronization is performed in the special subframe-based manner, a special subframe at the synchronization subframe position of the target cell is configured as having a longer guard period than that of a special subframe at the synchronization subframe position of the source cell so as to listen to a synchronization signal from the source cell.

According to another preferred embodiment of the disclosure, in a case that the synchronization is performed in the MBSFN subframe-based manner, a MBSFN subframe is configured at the synchronization subframe position of the source cell to transmit a synchronization signal, and a MBSFN subframe is configured at the synchronization subframe position of the target cell to listen to the synchronization signal from the source cell.

According to another preferred embodiment of the disclosure, a MBSFN blank subframe is configured at the synchronization subframe position of a neighboring cell at the same frequency range as the target cell in a cell cluster to which the target cell belongs.

According to another preferred embodiment of the disclosure, information about the synchronization subframe position interacted between the source cell and the target cell is included in a system information block of a physical downlink sharing channel.

According to another preferred embodiment of the disclosure, the information interacted in the cell information interacting step comprises information about stratum levels of the first cell and the second cell, in which the source cell is a cell having a lower stratum level among the first cell and the second cell; if the stratum levels of the first cell and the second cell are the same to each other, the source cell is a cell having a smaller number of neighboring cells among the first cell and the second cell; or the source cell is a cell starting up earlier among the first cell and the second cell.

According to another preferred embodiment of the disclosure, the first cell and the second cell use the same TDD configuration.

According to another preferred embodiment of the disclosure, coordinators are provided in cell clusters to which the first cell and the second cell belong respectively, and the coordinators are responsible for information interaction between the first cell and the second cell and direct synchronization between the first cell and the second cell.

According to another preferred embodiment of the disclosure, the coordinators of the first cell and the second cell interact synchronization periods of the first cell and the second cell with each other and instruct all cells at the same frequency range as the first cell within the cell cluster to which the first cell belongs and all cells at the same frequency range as the second cell within the cell cluster to which the second cell belongs to unify synchronization periods to be a shorter one among the synchronization periods of the first cell and the second cell.

According to another preferred embodiment of the disclosure, the target cell reports a synchronization error obtained by listening to a synchronization signal from the source cell to the coordinator of the target cell, and thus the coordinator instructs all cells at the same frequency range as the target cell within the cell cluster to which the target cell belongs to adjust clocks according to the synchronization error.

According to another preferred embodiment of the disclosure, in a case that the symbol-level synchronization is performed in a MBSFN subframe-based manner, the coordinator within the cell cluster to which the target cell belongs instructs neighboring cells at the same frequency range as the target cell within this cell cluster to configure a MBSFN blank subframe at the synchronization subframe position.

According to another preferred embodiment of the disclosure, during the synchronization between the first cell and the second cell, synchronization among cells belonging to the same frequency range within cell clusters to which the first cell and the second cell belong respectively is maintained all the time.

According to another aspect of the disclosure, there is also provided a device in a wireless communication system, the device including: a sending unit configured to send information indicating a position of a synchronization subframe and a radio frame having been used for sending a synchronization signal by a source cell where the device locates to a target cell, so as to determine a synchronization subframe position configurable for both the source cell and the target cell; and a configuring unit configured to configure the source cell according to the synchronization subframe position to send a synchronization signal, thereby synchronizing with the target cell, in which the target cell performs synchronization with the source cell being a synchronization source.

According to another aspect of the disclosure, there is also provided a device in a wireless communication system, the device including: a receiving unit configured to receive information indicating a position of a synchronization subframe and a radio frame having been used for sending a synchronization signal by a source cell from the source cell; a sending unit configured to send feedback information to the source cell according to the received information and configuration condition of a target cell where the device locates, for determining a synchronization subframe position configurable for both the source cell and the target cell; and a configuring unit configured to configure the target cell according to the synchronization subframe position to listen to the synchronization signal from the source cell, thereby synchronizing with the source cell.

According to another aspect of the disclosure, there is also provided a storage medium including machine readable program codes which when executed on an information processing apparatus, cause the information processing apparatus to perform the following steps: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position.

According to another aspect of the disclosure, there is also provided a program product including machine executable instructions which when executed on an information processing apparatus cause the information processing apparatus to perform the following steps: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position.

Other aspects of the embodiments of the disclosure will be presented in the following detailed description serving to fully disclose preferred embodiments of the disclosure but not to limit the disclosure.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings:

FIG. 3 is a schematic diagram illustrating an exemplary configuration of a radio frame in a case of performing synchronization in a MBSFN subframe-based manner according to an embodiment of the disclosure;

FIG. 5 is a schematic diagram illustrating another exemplary configuration of the radio frame in a case of performing synchronization in the MBSFN subframe-based manner according to an embodiment of the disclosure;

FIG. 6 is a schematic diagram illustrating another exemplary configuration of the radio frame in a case of performing synchronization in the MBSFN subframe-based manner;

FIG. 7 is a schematic diagram illustrating another exemplary configuration of the radio frame in a case of performing synchronization in the MBSFN subframe-based manner;

DETAILED DESCRIPTION OF THE INVENTION

Figure 1:
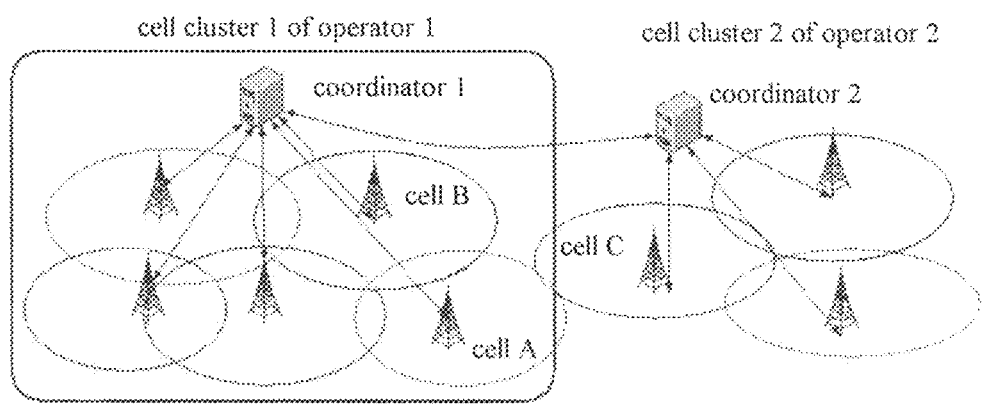
FIG. 1 is a schematic diagram illustrating an exemplary distribution of a wireless communication system according to an embodiment of the disclosure.

Exemplary embodiments of the present disclosure will be described below in conjunction with the accompanying drawings. For the sake of clarity and conciseness, not all the features of practical implementations are described in the specification. However, it is to be appreciated that numerous implementation-specific decisions shall be made during developing any of such practical implementations so as to achieve the developer's specific goals, for example, to comply with system- and business-related constraining conditions which will vary from one implementation to another. Moreover, it shall also be appreciated that such a development effort might be very complex and time-consuming but may simply be a routine task for those skilled in the art benefiting from this disclosure.

It shall further be noted that only those device structures and/or process steps closely relevant to the solutions of the disclosure are illustrated in the drawings while other details less relevant to the disclosure are omitted so as not to obscure the disclosure due to those unnecessary details.

The embodiments of the disclosure may be applied in various TDD communication systems e.g. TD-SCDMA and TDD LTE communication systems, and cells in the embodiments include small cells, for example, femto cell and Pico cell provided by a low power base station such as a home base station (HeNB) or the like.

Embodiments of the disclosure will be described below with reference to FIGS. 1-18. First, an exemplary distribution of a wireless communication system according to an embodiment of the disclosure will be described with reference to FIG. 1. FIG. 1 is a schematic diagram illustrating an exemplary distribution of a wireless communication system according to an embodiment of the disclosure.

As shown in FIG. 1, it is assumed that a cell A and a cell B are cells within the same cell cluster, a cell C is a cell within a different cell cluster, and serious interference occurs between the cell A and the cell C. It is to be noted that herein and hereinafter, it is assumed that synchronization among cells within the same cell cluster has been completed, and the discussion herein is only directed to interference among cells within different cell clusters (e.g. different operators).

Figure 2:
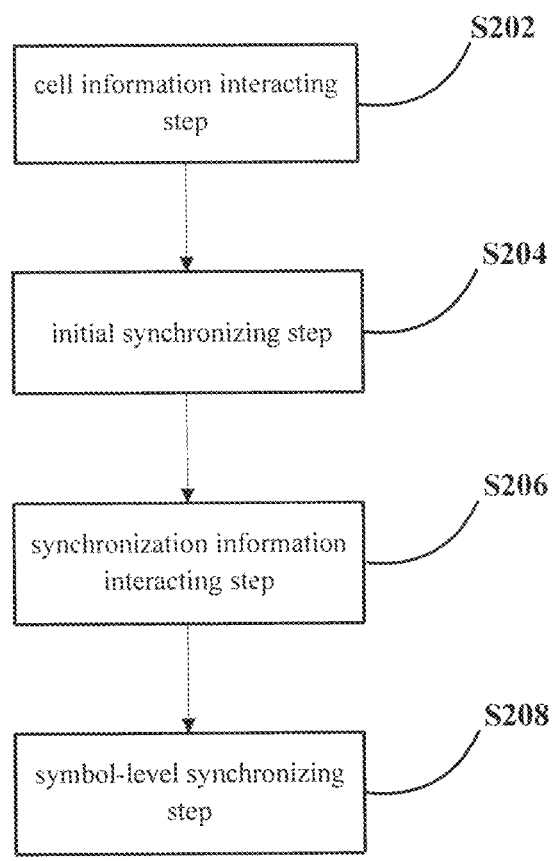
FIG. 2 is a flow chart illustrating an example of a procedure of a method in a wireless communication system according to an embodiment of the disclosure.

Next, a method in a wireless communication system according to an embodiment of the disclosure will be described with reference to FIG. 2. FIG. 2 is a flow chart illustrating an example of a procedure of a method in a wireless communication system according to an embodiment of the disclosure.

As shown in FIG. 2, a method 200 may include a cell information interacting step S202, an initial synchronizing step S204, a synchronization information interacting step S206 and a symbol-level synchronizing step S208. Processing in each of the steps will be described in detail below.

In the cell information interacting step S202, information about a first cell and a second cell having interference with each other is interacted between the first cell and the second cell to determine a source cell and a target cell among the first cell and the second cell, in which the target cell performs synchronization with the source cell being a synchronization source.

In one example, the information interacted in the cell information interacting step S202 may include information about stratum levels of the first cell and the second cell so as to determine the synchronization source among the two cells. Preferably, the source cell may be a cell having a lower stratum level among the first cell and the second cell; if the stratum levels of the first cell and the second cell are the same with each other, the source cell is a cell having a smaller number of neighboring cells among the first cell and the second cell; or the source cell is a cell starting up earlier among the first cell and the second cell. As an example, an shown in FIG. 1, within a cell cluster 1, for example, it is assumed that the stratum level of the cell B is higher than that of the cell A, and thus the cell A is the synchronization source for the cell B, and the stratum level of the cell C within a cell cluster 2 is also higher than that of the cell A, then the cell A is also the synchronization source for the cell C. This example is made based on such an expectation that all the cells perform synchronization with respect to the same clock source as much as possible, and at this time, this clock source might be a satellite such as global positioning system (GPS), BeiDou system or the like. Since hardware requirement for a cell base station is relatively high when directly receiving satellite time service and not all of the cells can receive the satellite time service, at this time, the clock source may be a cell directly receiving the satellite time service (referred to as a satellite time served cell), for example, a macro cell or certain small cells. Therefore, in some examples, when the first cell does not satisfy a condition of directly receiving the satellite time service but may receive a synchronization signal of the satellite time served cell, the satellite time served cell is made to be the synchronization source, and at this time, the first cell is determined as stratum level 1 for example. However, for the second cell which can neither satisfy the condition of directly receiving satellite time service nor receive the synchronization signal of the satellite time served cell (for example, out of a coverage range of the satellite time served cell), if it can receive a synchronization signal of the cell of stratum level 1, then the cell of the stratum level 1 is made to be the synchronization source, and the second cell is determined as stratum level 2, and the like. Therefore, a cell of a high stratum level always synchronizes to a cell of a low stratum level, thereby reducing error during synchronization and ensuring consistence among clocks of respective cells as much as possible.

Further, in another example, the information interacted in the cell information interacting step S202 may include number of neighboring cells of each of the cell A and the cell B, and the cell having a smaller number of neighboring cells is determined to be the synchronization source so as to reduce system overhead.

In a specific example, different operators may generally have their own cell clusters and a coordinator is configured within each of the cell clusters, coordinators of different operators may be connected through backhaul, and thus the above described cell information may be interacted through the coordinators. However, it is to be understood that the above described cell information may be interacted through an air interface by cells having interference with each other rather than through the coordinators, and the disclosure makes no limitation.

After determining the source cell and the target cell according to the information interacted in the cell information interacting step, in the initial synchronizing step S204, the target cell performs initial frame-level synchronization with the source cell being the synchronization source. Specifically, for example, the target cell obtains a frame time difference after measuring a Primary Synchronization Signal/Secondary Synchronization Signal (PSS/SSS) of the source cell, and adjusts its clock to realize the initial frame-level synchronization with the source cell. In one example, the target cell and the source cell belong to different cell clusters, the coordinator in the cell cluster in which the target cell is located may receive the frame time difference between the target cell and the source cell from the target cell, and the coordinator cause all the cells in a corresponding frequency range to adjust clocks to realize the initial frame-level synchronization among clusters. After performing the frame-level synchronization using the PSS/SSS, the target cell decodes a Physical Broadcast Channel (PBCH) to obtain a System Frame Number (SFN) in a Main Information Block (MIB) for use in subsequent symbol-level synchronization. Next, in the synchronization information interacting step S206, information about a synchronization subframe position is interacted between the source cell and the target cell to determine a synchronization subframe position configurable for both the source cell and the target cell.

In an example of the disclosure, the target cell needs to listen to the synchronization signal of the source cell, e.g. a cell reference signal (CRS) of the target cell, so as to obtain a more accurate time error to thereby perform further synchronization. In one specific example, all neighboring TDD cells should have the same uplink and downlink subframe configurations, listen to the CRS signal transmitted by the source cell on a downlink subframe, and the target cell needs to configure its corresponding downlink subframe, that is, to stop transmitting downlink signal on the corresponding downlink subframe and detect the CRS signal of the source cell. Further, to avoid signals transmitted from other cells around the target cell on the corresponding downlink subframe from causing interference, it is also possible to configure corresponding downlink subframes of other cells to stop these cells from transmitting signals on this subframe. Specifically, for example, it is possible to configure the corresponding downlink subframe of the target cell as a MBSFN subframe so as to listen to the CRS of the source cell on this MBSFN subframe; as another example, it is possible to configure a special subframe, the source cell transmits the CRS on a downlink portion of the special subframe, and the target cell configures corresponding portion of its corresponding special subframe to not transmit the downlink signal so as to listen to the CRS of the source cell.

It is to be noted that in one example of the invention, when performing synchronization among cells within the same cell cluster, the above described configurations of each of stratum levels of respective cells are the same, and thus when performing in-cluster cell synchronization, the synchronization can be realized provided that the stratum levels of each of the cells are known. However, in some other examples, for example, when performing synchronization among cells belonging to different operators, it needs to acquire a specific synchronization subframe position (for example, a subframe for transmitting the synchronization signal, a subframe for listening to the synchronization signal or a muted subframe for avoiding interference to listening for synchronization of other cells) of each of two cells to be synchronized with each other, so as to realize synchronization among cells of different clusters.

Then, in the symbol-level synchronizing step S208, symbol-level synchronization between the source cell and the target cell is performed according to the determined synchronization subframe position.

Preferably, in the symbol-level synchronizing step S208, the above described MBSFN subframe-based manner and the special subframe-based manner may be adopted to listen to the synchronization signal so as to perform the symbol-level synchronization. Meanwhile, previous synchronizing manners with cells within respective clusters of the source cell and the target cell keep the same.

Specifically, in a case of performing synchronization in the MBSFN subframe-based manner, a MBSFN subframe is configured at the synchronization subframe position of the source cell to transmit the synchronization signal, and a MBSFN subframe is configured at the synchronization subframe position of the target cell to listen to the synchronization signal from the source cell. Preferably, in a case of adopting the MBSFN subframe-based manner, a MBSFN blank subframe is configured at the synchronization subframe position of a neighboring cell at the same frequency range as the target cell in a cell cluster to which the target cell belongs to avoid interference. On the other hand, in a case that the synchronization is performed in the special subframe-based manner, the special subframe at the synchronization subframe position of the target cell is configured as having a longer guard period (GP) than that of the special subframe at the synchronization subframe position of the source cell so as to listen to the synchronization signal from the source cell.

Specifically, in the synchronization information interacting step S206, the source cell first sends information indicating a position of a synchronization subframe (SF) and a radio frame (RF) having been used for sending a synchronization signal by the source cell to the target cell, the target cell feeds back according to its own configuration condition, thereby determining the synchronization subframe position configurable for both the source cell and the target cell. The indication information sent to the target cell by the source cell may be located in a System Information Block (SIB) of Physical Downlink Share Channel (PDSCH).

The following table 1 for example provides an example of a format of the indication information.

TABLE 1

| | SF indication | | | | | | | | |
|---|---|---|---|---|---|---|---|---|---|
| | Subframe | | | | | | | | |
| | #0 | #1 | #2 | #3 | #4 | #5 | #6 | #7 | #8 | #9 |
| Indication signal | — | 000 | — | 001 | 010 | — | 100 | 101 | 110 | 111 |

Particularly, the first three bits are used to indicate which subframe is used by the source cell, and the latter several bits indicate in which radio frame the synchronization signal is located and the number of bits is not fixed.

FIG. 3 is a schematic diagram illustrating an exemplary configuration of a radio frame in a case of performing synchronization in a MBSFN subframe-based manner according to an embodiment of the disclosure. Herein, it is assumed that both of the source cell and the target cell use the TDD configuration #2.

As shown in FIG. 3, the source cell (the cell A as shown in FIG. 1 herein) originally sends the CRS on SF#3, RF#2 to perform synchronization, then the source cell sends 00110 to the cell C. If the source cell originally sends the CRS on SF#3, RF#5 to perform synchronization, then it sends 001101 to the cell C.

If the position of the synchronization subframe and the radio frame having been used for sending the synchronization signal by the source cell is available in the target cell, the target cell returns information indicating this position is available and configures a synchronization subframe at this position to listen to the synchronization signal from the source cell; and if the position of the synchronization subframe and the radio frame having been used for sending the synchronization signal by the source cell is unavailable in the target cell, the target cell feeds back information indicating a subframe position available for itself to the source cell, the source cell determines the synchronization subframe position configurable for both the source cell and the target cell according the fed back information and its own configuration condition and sends information indicating the synchronization subframe position to the target cell.

Figure 4:
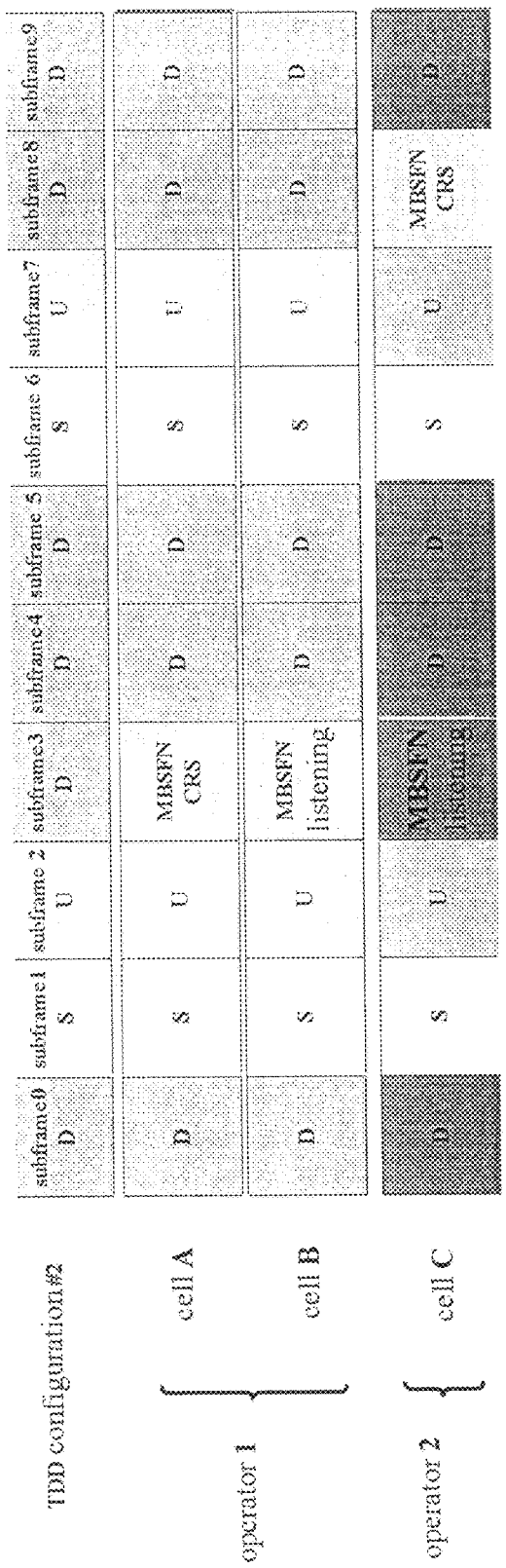
FIG. 4 is a schematic diagram illustrating another exemplary configuration of the radio frame in a case of performing synchronization in the MBSFN subframe-based manner according to an embodiment of the disclosure.

Specifically, for example, if the target cell determines the subframe position is available after receiving the indication information from the source cell, then it returns 1 to indicate agreement, and configures this subframe (that is, MBSFN listening) to listen to the synchronization signal from the source cell, as shown in FIG. 4, which is a schematic diagram illustrating another exemplary configuration of a radio frame in a case of performing synchronization in a MBSFN subframe-based manner according to an embodiment of the disclosure, for example.

On the other hand, if the position indicated by the source cell has been configured by the target cell, then the target cell needs to feed back information indicating which subframes may be configured to perform listening. Still taking the MBSFN subframe-based manner as an example, this feedback information may be for example configured as shown in the following Table 2 in which 1 represents the subframe is available and 0 represents the subframe is unavailable. Further, among all the 7 TDD frame structure configurations, SF#2 is a downlink subframe, SF#0 and SF#5 can not be configured as MBSFN, and thus there is no need to indicate these subframes. Further, it is assumed that the source cell and the target cell use the same frame structure configurations and positions of the uplink subframes thereof are the same, and thus it is also possible not to indicate the configuration of the uplink subframe positions (for example, SF#7 in Table 2 is an uplink subframe in TDD configuration #2, which may not be indicated).

TABLE 2

| Available SF indication | | | | | | | | | | |
|---|---|---|---|---|---|---|---|---|---|---|
| | Subframe | | | | | | | | | |
| | #0 | #1 | #2 | #3 | #4 | #5 | #6 | #7 | #8 | #9 |
| available | — | 1 | — | 1 | 1 | — | 1 | 1 | 1 | 1 |
| unavailable | — | 0 | — | 0 | 0 | — | 0 | 0 | 0 | 0 |

FIG. 5 is a schematic diagram illustrating another exemplary configuration of a radio frame in a case of performing synchronization in the MBSFN subframe-based manner according to an embodiment of the disclosure.

As shown in FIG. 5, both of a cell A and a cell C adopt TDD configuration #2, and the cell C has configured SF#3 indicated by the cell A to send MBSFN CRS, and has also configured SF#8 as MBSFN listening to perform listening. In this case, for the cell C, in addition to SF#0, SF#2 and SF#5, since SF#7 has been configured as an uplink subframe in TDD configuration #2 and SF#3 has been configured by the target cell to send MBSFN CRS and thus can not be used for listening, corresponding available synchronization subframes in TDD configuration #2 include SF#1, SF#4, SF#6, SF#8 and SF#9, and the cell C only needs to send 5-bit information to indicate a subframe configuration available to itself. In this example, SF#8 has been occupied, and thus the target cell C sends 11101 to the source cell, and the source cell maps the 5-bit information onto its subframe.

After having received the feedback information from the target cell, the source cell determines and re-selects a subframe position configurable for both the source cell and the target cell according to the feedback information and its own configuration condition, and sends the information indicating the subframe position (for example, 3 bits) to the target cell again. The target cell may for example determine the new synchronization subframe position in the following way:

(a) if there exists another subframe used for sending a synchronization signal in the radio frame having been used for sending the synchronization signal by the source cell while a position of this subframe is available in the target cell, then determining the position of this subframe as the synchronization subframe position;

(b) in a case that (a) does not hold true, if a special subframe in the radio frame having been used for sending the synchronization signal by the source cell is available, then determining a position of the special subframe as the synchronization subframe position;

(c) in a case that (a) and (b) do not hold true, randomly selecting one from subframe positions available for both the source cell and the target cell as the synchronization subframe position; and (d) if there exists no synchronization subframe position configurable for both the source cell and the target cell in the radio frame having been used for sending the synchronization signal by the source cell, then repeating operations in (a) to (c) to continue searching in next radio frame.

As shown in FIG. 6, which is a schematic diagram illustrating another exemplary configuration of the radio frame in a case of performing synchronization in the MBSFN subframe-based manner according to an embodiment of the disclosure, it is assumed that the source cell A selects SF#4 as the new synchronization subframe after having received the feedback information of the target cell C and sends 010 to the target cell C, then the target cell C performs corresponding configuration according to this information so as to listen to the synchronization signal from the source cell. At the same time, neighboring cells at the same frequency range as the target cell around the target cell C may configure MBSFN blank subframes at this synchronization subframe position to avoid interference.

In another example of the disclosure, the symbol-level synchronization between the source cell and the target cell may also be implemented in the following way: in addition to the information indicating the position of the synchronization subframe and the radio frame that the source cell has used for sending the synchronization signal, the source cell further sends information of a position of a synchronization subframe and a radio frame available to itself to the target cell, whereby the target cell may determine the synchronization subframe position configurable for both the source cell and the target cell according to these pieces of information and its own configuration condition, and send information indicating the determined synchronization subframe position to the source cell. The target cell may for example determine the synchronization subframe position in the following way:

(a) if the position of the synchronization subframe and the radio frame having been used for sending the synchronization signal by the source cell is available in the target cell, then determining this position as the synchronization subframe position;

(b) in a case that (a) does not hold true, if a special subframe in the radio frame having been used for sending the synchronization signal by the source cell is available, then determining a position of the special subframe as the synchronization subframe position;

(c) in a case that (a) and (b) do not hold true, randomly selecting one from subframe positions available for both the source cell and the target cell as the synchronization subframe position; and (d) if there exists no synchronization subframe position configurable for both the source cell and the target cell in the radio frame having been used for sending the synchronization signal by the source cell, then repeating operations in (a) to (c) to continue searching in next radio frame.

Specifically, for example, the source cell A may send SIB information to the target cell C through PDSCH to indicate its own configuration condition. The SIB information may include for example three parts, the first part being constituted by 3 bits for indicating a position of a subframe that the source cell A has configured as MBSFN CRS, as shown in the following Table 3; the second part being constituted by 7 bits, in which 1 represents a corresponding subframe may be configured as MBSFN CRS, and 0 represents a corresponding subframe may be not configured as MBSFN CRS, as shown in the following Table 4; and the number of bits of the third part is not fixed, indicating at which radio frame the synchronization signal is located.

TABLE 3

Used SF indication

| | #0 | #1 | #2 | #3 | #4 | #5 | #6 | #7 | #8 | #9 |
|---|---|---|---|---|---|---|---|---|---|---|
| Indication signal | — | 000 | — | 001 | 010 | — | 100 | 101 | 110 | 111 |

TABLE 4

Available SF indication

| | #0 | #1 | #2 | #3 | #4 | #5 | #6 | #7 | #8 | #9 |
|---|---|---|---|---|---|---|---|---|---|---|
| available | — | 1 | — | 1 | 1 | — | 1 | 1 | 1 | 1 |
| unavailable | — | 0 | — | 0 | 0 | — | 0 | 0 | 0 | 0 |

For example, as shown in FIG. 7, which is a schematic diagram illustrating another exemplary configuration of the radio frame in a case of performing synchronization in the MBSFN subframe-based manner according to an embodiment of the disclosure, it is assumed that the source cell A has sent MBSFN CRS on SF#3, RF#2 to perform synchronization and performs listening on SF#4. Further, as described above, in all the frame structure configurations, SF#0, SF#2 and SF#5 are not configurable, and it is assumed that the target cell and the source cell adopt the same TDD configuration #2 in this example, SF#7 is an uplink subframe and thus is not configurable. In this case, the source cell A only needs to send 6-bit information indicating its configurable subframe position to the target cell C, and at this time, the source cell A may for example send 001 100111 10 to the target cell C to indicate that SF#1, SF#6, SF#8 and SF#9 may also be configured to send MBSFN CRS. It is to be noted that if there exists a plurality of subframes having been configured to send the synchronization signal in the source cell, the plurality of subframes can be informed to the target cell one by one, but the signaling overhead may be too large. Of course, in order to save the signaling overhead, it is also possible to inform the target cell of information about only one used synchronization subframe.

After having received the above information from the source cell, the target cell C re-selects a position of a subframe configurable for both the source cell and the target cell as the synchronization subframe position according to this information and its own configuration, and sends 3-bit information indicating the synchronization subframe position to the source cell A, and thus the source cell and the target cell may perform configuration according to the newly determined synchronization subframe position.

Further, preferably, coordinators may be provided in cell clusters to which the source cell and the target cell belong respectively, and the coordinators are responsible for information interaction between the source cell and the target cell and direct synchronization between the source cell and the target cell. The coordinators may obtain information such as synchronization configuration, geographical position and so on of each cell in respective cell clusters, and also know the neighboring cell clusters having interference with each other are cell clusters of different operators.

Specifically, for example, two coordinators may interact information of their cell clusters through backhaul and coordinate the synchronization procedure. In the cell information interacting procedure, the two coordinators may obtain IDs and corresponding stratum levels of cells having interference with one another through interaction, and send ID of an interfering cell to an interfered cell in their respective clusters while directing these two cells to perform synchronization. Further, the two coordinators further interact synchronization periods within their respective cell clusters with each other and unify them to be a shorter one thereof.

In the initial synchronization procedure, the target cell notifies its coordinator after obtaining the frame time difference with the source cell, then the coordinator notifies all the cells at the same frequency range as the target cell within the cell cluster to adjust clocks so as to realize initial frame-level synchronization among clusters.

In the subsequent synchronization information interacting procedure and the symbol-level synchronizing procedure, when the source cell or the target cell determines the final synchronization subframe position and notifies it to the counterpart cell, it further notifies the synchronization subframe position information to its own coordinator at the same time. The coordinator of the target cell may obtain the synchronization subframe position through interaction between the coordinators or through notification by the target cell directly. In a case of performing synchronization in the MBSFN subframe-based manner, the coordinator of the target cell may instruct neighboring cells at the same frequency range as the target cell around the target cell within the cell cluster to configure MBSFN blank subframes at the corresponding synchronization subframe position to avoid interference. Further, the target cell may report to its coordinator after obtaining the specific synchronization error with respect to the source cell through listening, and thus the coordinator directs all the cells at the same frequency range as the target cell within the cell cluster to which the target cell belongs to adjust clocks according to the synchronization error.

As can be seen from above, by providing the coordinator, since the coordinator know configurations conditions of all the cells within the whole cell cluster, it is advantageous to direct synchronization among cells belonging to different operators and coordinate and unify clocks of each of cells within the cell cluster as a whole by the coordinator so as to keep synchronization between cells within the cluster.

It is to be noted that, synchronization among cells belonging to different operators has been described above taking the case of performing synchronization in the MBSFN subframe-based manner as an example, in a case of performing synchronization in the special subframe-based manner, the synchronization procedure is substantially the same as that in a case of performing synchronization in the MBSFN subframe-based manner, and thus only differences therebetween will be described below.

As described above, if the synchronization subframe position determined by the source cell or the target cell at last is the special frame position, then it means that the synchronization is performed in the special subframe-based manner, and thus the special subframe at the synchronization subframe position of the target cell is configured as having a longer guard period than that of the special subframe at the synchronization subframe position of the source cell so as to listen to the synchronization signal from the source cell.

Specifically, for example, if the TDD special subframe-based manner has been determined to be used, then the target cell may directly configure the special subframe as config0, and thus this special subframe has a longest guard period (GP) length so as to listen to the synchronization signal from the source cell. Configurations of the special subframe in cases of normal cyclic prefix (CP) and extended CP are as shown in FIG. 5. In TR 36.922, it provides that in the case of normal CP, the source cell may select config1, config2, config3, config4, config6, config7 or config8 and the target cell may select config5 or config6, and in the case of extended CP, the source cell may select config1, config2, config5 or config6, and the target cell may select config0 or config4. In order to reduce the signaling overhead, the target cell may select config0 to have the longest GP length, thereby facilitating listening to the synchronization signal from the source cell.

TABLE 5

| | Normal CP | | | Extended CP | | |
|---|---|---|---|---|---|---|
| Config | DwPTS | GP | UpPTS | DwPTS | GP | UpPTS |
| 0 | 3 | 10 | 1 | 3 | 8 | 1 |
| 1 | 9 | 4 | 1 | 8 | 3 | 1 |
| 2 | 10 | 3 | 1 | 9 | 2 | 1 |
| 3 | 11 | 2 | 1 | 10 | 1 | 1 |
| 4 | 12 | 1 | 1 | 3 | 7 | 2 |
| 5 | 3 | 9 | 2 | 8 | 2 | 2 |
| 6 | 9 | 3 | 2 | 9 | 1 | 2 |
| 7 | 10 | 2 | 2 | | | |
| 8 | 11 | 1 | 2 | | | |

Figure 8:
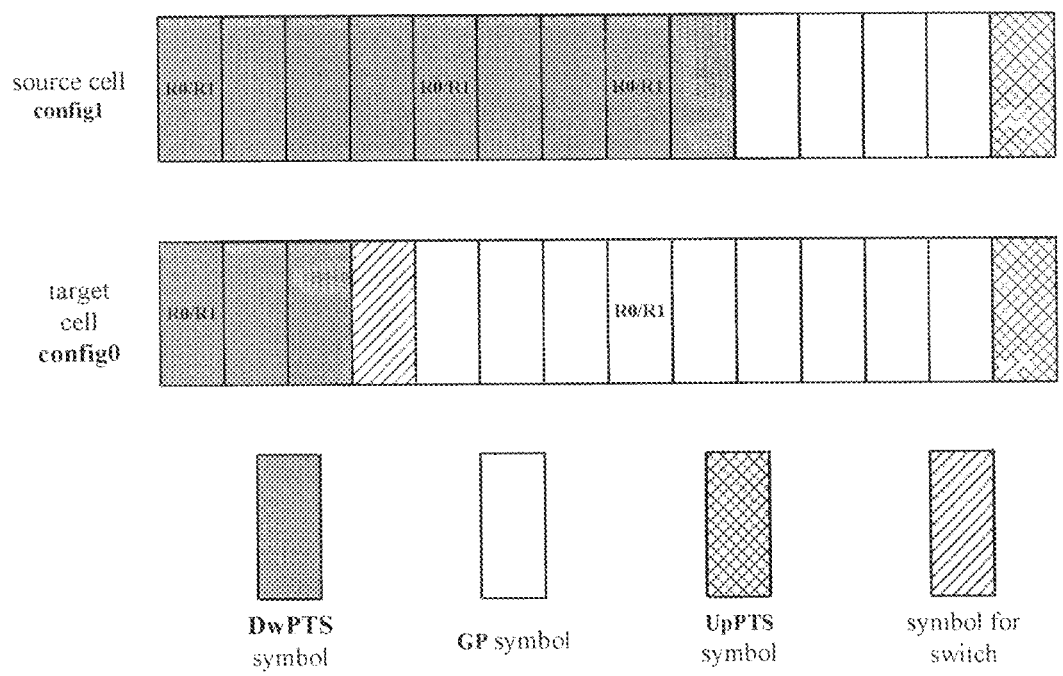
FIG. 8 is a schematic diagram illustrating an exemplary configuration in a case of performing synchronization in a special subframe-based manner.

As shown in FIG. 8, which is a schematic diagram illustrating an exemplary configuration in a case of performing synchronization in a special subframe-based manner according to an embodiment of the disclosure, it is assumed that in the case of normal CP, the source cell is configured as config1, and the target cell is configured as config0. The target cell converts into reception state after completely sending the downlink data. Since the conversion time between uplink and downlink for a home base station (HeNB) is generally smaller than 15 μs, it is sufficient to perform conversion in time of one OFDM symbol. From the fifth OFDM symbol, the target cell receives the CRS carried by the special subframe from the source cell to perform synchronization.

Similarly, in the case that the coordinators are provided, the target cell may report the specific synchronization error obtained through listening to its coordinator, and the coordinator directs all the cells at the same frequency range as the target cell within the cell cluster to perform adjustment according to the synchronization error.

It is to be noted here, in the case of performing synchronization in the special subframe-based manner, there is no need to make the neighboring cells at the same frequency range as the target cell be mute at the synchronization subframe position (that is, setting to be a MBSFN blank subframe) to avoid interference as in the case of performing synchronization in the MBSFN subframe-based manner.

Figure 9:
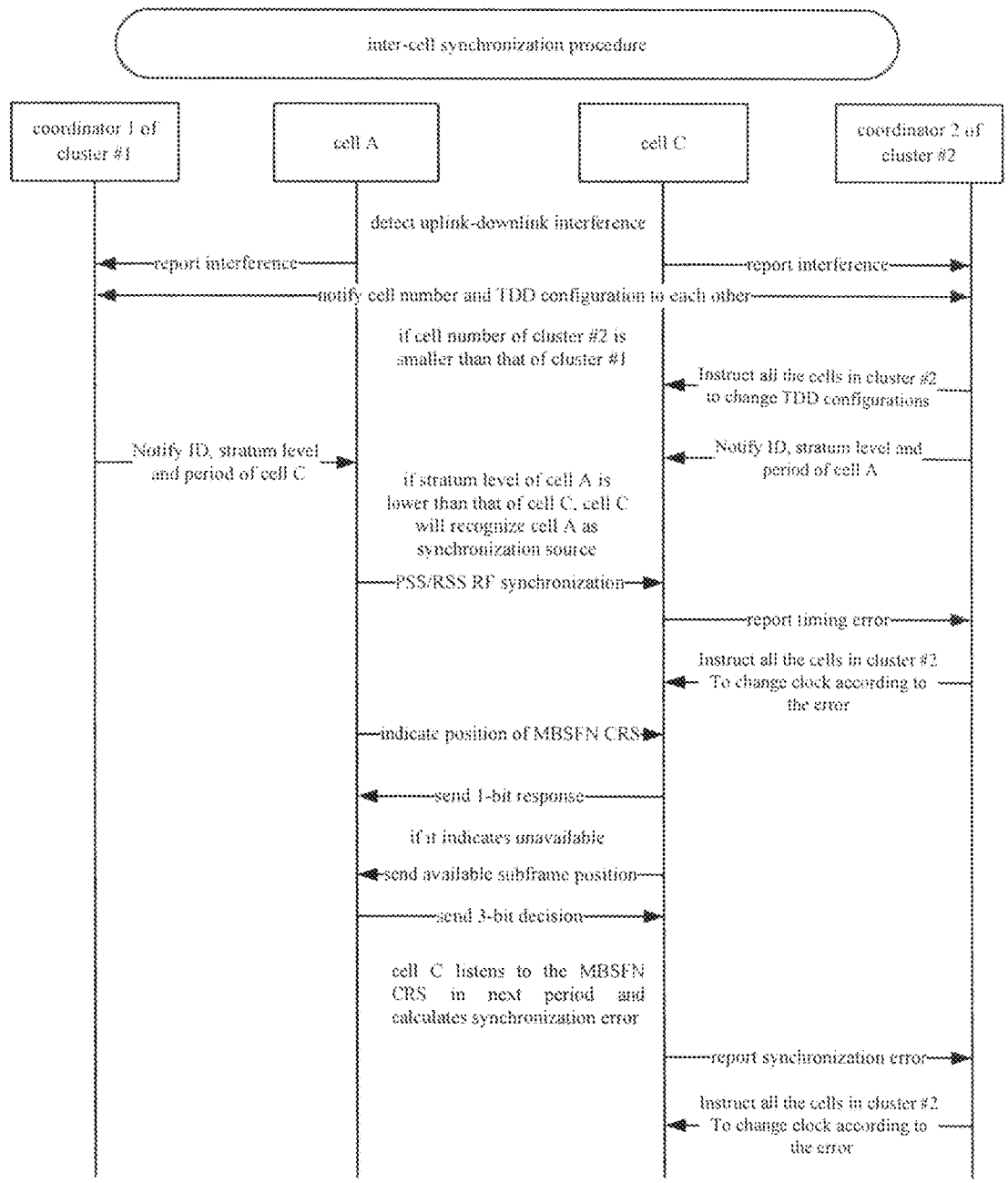
FIG. 9 is a flow chart illustrating an example of a signaling interaction procedure for synchronization among cells belonging to different operators according to an embodiment of the disclosure.

FIG. 9 is a flow chart illustrating an example of a signaling interaction procedure for synchronization among cells belonging to different operators according to an embodiment of the disclosure. The signaling interaction procedure as shown in FIG. 9 is an example provided in a case where it is assumed that the synchronization is performed in the MBSFN subframe-based manner, the cell A is the source cell, the cell C is the target cell, the source cell determines the final synchronization subframe position according to the feedback of the target cell and its own configuration, and the coordinators of the cell clusters direct the synchronization procedure among cell clusters.

Specifically, as shown in FIG. 9, in a case that the cell A and the cell C detect serious interference from counterpart, they report the interference to a coordinator 1 and a coordinator 2 of their each own. Then, the two coordinators inform the cell numbers and TDD configurations within the cell cluster #1 and cell cluster #2 to which the coordinator 1 and the coordinator 2 belong respectively through backhaul connection for example. It is assumed here that the number of cells in the cell cluster #2 is smaller than that in the cell cluster #1, and thus the coordinator 2 in the cell cluster #2 instructs all the cells at corresponding frequency ranges within the cell cluster #2 to change their TDD configurations so as to unify the uplink and downlink time slot ratio of the TDD frame structure with the cell cluster #1.

Next, the two coordinators obtain information such as IDs, stratum levels and synchronization periods of the cells interfering with each other through interaction, determine the source cell and the target cell among the cell A and the cell C according to the stratum level information, and unify the synchronization periods of the two cell clusters to be a shorter one thereamong. Then, for example, the coordinator 1 notifies the cell A of the ID, stratum level and period of the cell C, the coordinator 2 notifies the cell C of the ID, stratum level and period of the cell A, and the coordinator 1 and the coordinator 2 instruct the cell A and the cell C to perform synchronization. In this example, the stratum level of the cell A is lower than that of the cell C, and thus the cell C performs synchronization with the cell A being the synchronization source.

Next, the frame-level synchronization between the cell A and the cell C is performed through PSS/SSS. Then, the target cell C reports the obtained frame time difference to its coordinator 2, and thus the coordinator 2 instructs all the cells at the same frequency range as the target cell C within the cell cluster #2 to perform clock adjustment according to the time difference, thereby realizing the initial frame-level synchronization among clusters.

Thereafter, as described for the synchronization information interacting step above, the source cell A notifies the target cell C of a position (that is, the synchronization subframe position) that the source cell A has used for sending the synchronization signal (MBSFN CRS), if this position is available in the target cell C, then the target cell C returns "1" to the source cell A to indicate that it agrees to configure this position for listening. Otherwise, the target cell C may send information indicating a synchronization subframe position configurable for listening to the source cell A, and the source cell A determines a new synchronization subframe position according to this information and notifies the target cell C of the new synchronization subframe position using e.g. 3-bit decision information.

Next, as described for the symbol-level synchronizing step above, the target cell C listens to the MBSFN CRS from the source cell A in next synchronization period and calculates the synchronization error. Then, the target cell C reports the synchronization error to its coordinator 2, and thus the coordinator 2 may instruct all the cells at the same frequency range as the target cell C within the cell cluster #2 to change their clocks according to the error so as to realize accurate inter-cluster synchronization.

It is to be understood that the above signaling interacting procedure described with reference to FIG. 9 is only an example but not limitation, those skilled in the art may conceive of signaling interacting procedures in other cases (for example, without involvement of the coordinators, determining the final synchronization subframe position by the target cell, synchronizing in the special subframe-based manner, synchronization among three or more cell clusters and the like) according to the principle of the disclosure.

The procedure of synchronization between cells belonging to two different operators has been described above, but it is to be understood that this is only an example but not limitation, the disclosure also applies to synchronization among cells belonging to three or more different operators, and the synchronization procedure is substantially the same as the synchronization procedure between two cells. Next, the synchronization procedure among cells belonging to three different operators will be specifically described with reference to FIG. 10 and FIG. 11 below.

Figure 10:
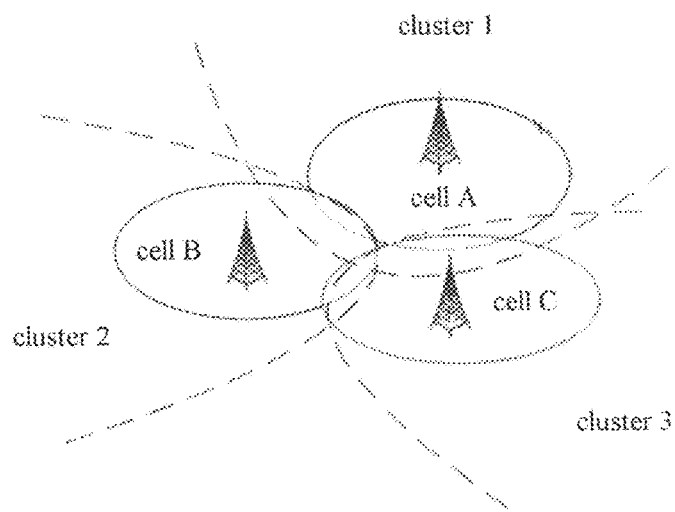
FIG. 10 is a schematic diagram illustrating another exemplary distribution of a wireless communication system according to an embodiment of the disclosure.

FIG. 10 is a schematic diagram illustrating another exemplary distribution of a wireless communication system according to an embodiment of the disclosure. As shown in FIG. 10, at this time, mutual interference occurs among cell A, cell B and cell C belonging to three different operators, then coordinators of respective cell clusters may interact stratum level information of the cells interfering with each other so as to select a cell having the lowest stratum level thereamong as the synchronization source, and the other two cells are target cells. The specific synchronization procedure is substantially consistent with the above synchronization procedure between two cells, but the source cell needs to perform signaling interaction with two target cells at the same time. For example, after the source cell has sent a signaling indicating its own used synchronization subframe position, if one target cell refuses to configure the synchronization subframe at this position, the source cell also needs to notify another target cell to return a signaling indicating an available subframe, and then the source cell needs to select a subframe position configurable for the three cells as the synchronization subframe position.

Figure 11:
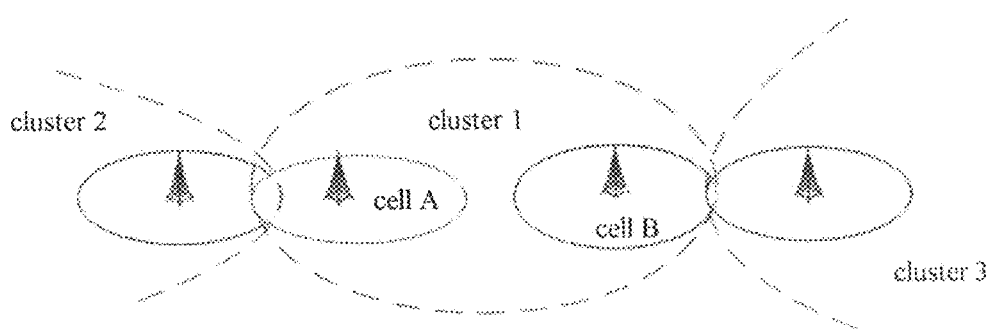
FIG. 11 is a schematic diagram illustrating another exemplary distribution of a wireless communication system according to an embodiment of the disclosure.

A synchronization procedure in a case that there exist synchronizing objects belonging to different operators within the same cell cluster will be described with reference to FIG. 11 below. FIG. 11 is a schematic diagram illustrating another exemplary distribution of a wireless communication system.

As shown in FIG. 11, a cell cluster 1 needs to synchronize with cell clusters 2 and 3 belonging to two different operators at the same time, and at this time, a coordinator of the cell cluster 1 needs to interact with coordinators of the cell clusters 2 and 3 at the same time, thereby realizing synchronization among the three cell clusters at last. The specific synchronization procedure is substantially consistent with the above described synchronization procedure, that is, after measuring the synchronization error, three coordinators interact with each other and select a cell cluster having the largest number of cells as reference, and the other two clusters perform corresponding adjustment.

It is to be noted that, during the inter-cluster synchronization, previous normal synchronization procedure is still performed within the clusters, that is, cells at the same frequency range within the cell clusters keep synchronization all the time. Preferably, the cells performing inter-cluster synchronization may notify the coordinator after measuring the synchronization error, so as to instruct all the cells at corresponding frequency range within the cluster to adjust the synchronization error with respect to neighboring clusters.

Further, it is to be understood that although the procedure example of the method in the wireless communication system according to the embodiment of the disclosure has been described above, but this is only an example but not limitation, and those skilled in the art may modify the above described procedure according to the principle of the disclosure, and such modifications should be considered as falling within the substantive scope of the disclosure.

Next, a functional configuration example of a device on source cell side according to an embodiment of the disclosure will be described with reference to FIG. 12 to FIG. 15.

Figure 12:
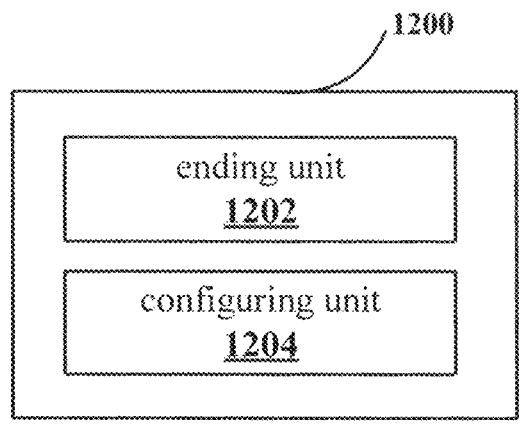
FIG. 12 is a block diagram illustrating an example of functional configuration of a device in a wireless communication system according to an embodiment of the disclosure.

FIG. 12 is a block diagram illustrating an example of functional configuration of a device in a wireless communication system according to an embodiment of the disclosure.

As shown in FIG. 12, a device 1200 may include a sending unit 1202 and a configuring unit 1204.

The sending unit 1202 may be configured to send information indicating a position of a synchronization subframe and a radio frame having been used for sending a synchronization signal by a source cell where the device 1200 locates to a target cell, so as to determine a synchronization subframe position configurable for both the source cell and the target cell. It is to be understood that as described above, the synchronization subframe position may be determined by the source cell or the target cell.

The configuring unit 1204 may be configured to configure the source cell according to the synchronization subframe position to send a synchronization signal, thereby synchronizing with the target cell.

Preferably, the configuring unit 1204 may be further configured to configure a MBSFN subframe (that is, MBSFN CRS) at the synchronization subframe position of the source cell to transmit the synchronization signal if the synchronization subframe position is not a special subframe position, otherwise configure a special subframe at the synchronization subframe position of the source cell as having a shorter guard period than that of a special subframe at the synchronization subframe position of the target cell.

Figure 13:
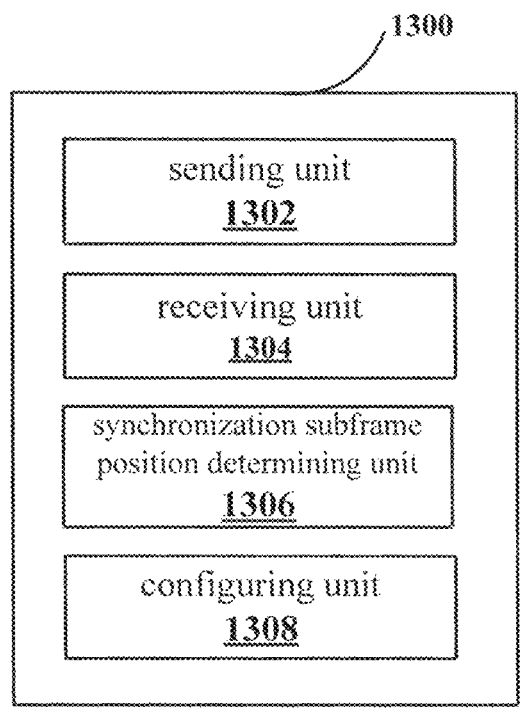
FIG. 13 is a block diagram illustrating an example of functional configuration of a device in a wireless communication system according to another embodiment of the disclosure.

FIG. 13 is a block diagram illustrating an example of functional configuration of a device in a wireless communication system according to another embodiment of the disclosure. The case as shown in FIG. 13 corresponds to the above case where the synchronization subframe position is determined on the source cell side.

As shown in FIG. 13, a device 1300 may include a sending unit 1302, a receiving unit 1304, a synchronization subframe position determining unit 1306 and a configuring unit 1308. Functional configurations of the sending unit 1302 and the configuring unit 1308 are the same as that of the sending unit 1202 and the configuring unit 1204 described with reference to FIG. 12 above, and no repeated description will be made herein. Only examples of functional configurations of the receiving unit 1304 and the synchronization subframe position determining unit 1306 will be described in detail below.

The receiving unit 1304 is configured to receive feedback information indicating a subframe position available for the target cell from the target cell.

The synchronization subframe position determining unit 1306 may be configured to determine the synchronization subframe position configurable for both the source cell and the target cell according to the feedback information and configuration condition of the source cell.

Specifically, the synchronization subframe position determining unit 1306 may be further configured to determine the synchronization subframe position in the following way:

(a) if the position of the synchronization subframe and the radio frame having been used for sending the synchronization signal by the source cell is available in the target cell, then determining this position as the synchronization subframe position;

(b) in a case that (a) does not hold true, if there exists another subframe used for sending a synchronization signal in the radio frame having been used for sending the synchronization signal by the source cell while a position of this subframe is available in the target cell, then determining the position of this subframe as the synchronization subframe position;

(c) in a case that (a) and (b) do not hold true, if a special subframe in the radio frame having been used for sending the synchronization signal by the source cell is available, then determining a position of the special subframe as the synchronization subframe position;

(d) in a case that (a), (b) and (c) do not hold true, randomly selecting one from subframe positions available for both the source cell and the target cell as the synchronization subframe position; and (e) if there exists no synchronization subframe position configurable for both the source cell and the target cell in the radio frame having been used for sending the synchronization signal by the source cell, then repeating operations in (a) to (d) to continue searching in next radio frame.

Figure 14:
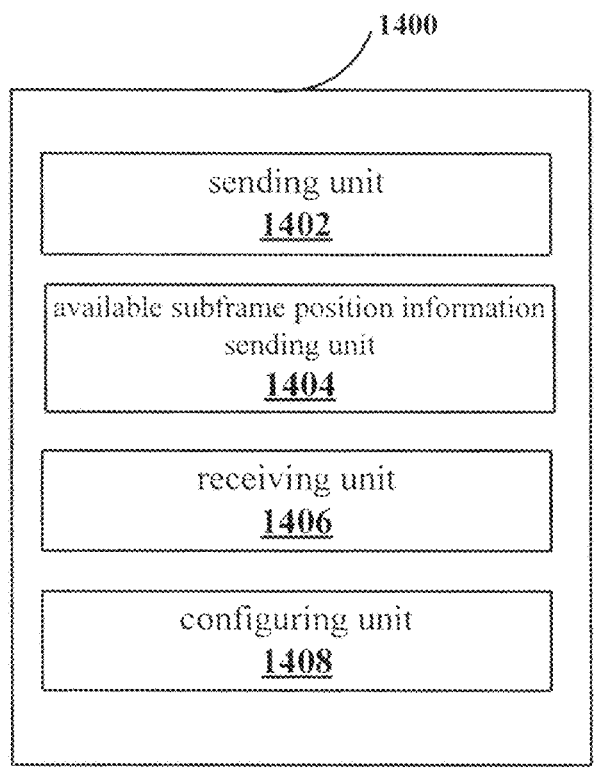
FIG. 14 is a block diagram illustrating an example of functional configuration of a device in a wireless communication system according to another embodiment of the disclosure.

FIG. 14 is a block diagram illustrating an example of functional configuration of a device in a wireless communication system according to another embodiment of the disclosure. The case as shown in FIG. 14 corresponds to the above case where the synchronization subframe position is determined on the target cell side.

As shown in FIG. 14, a device 1400 may include a sending unit 1402, an available subframe position information sending unit 1404, a receiving unit 1406 and a configuring unit 1408. Functional configurations of the sending unit 1402 and the configuring unit 1408 are the same as that of the sending unit 1202 and the configuring unit 1204 described with reference to FIG. 12 above, and no repeated description will be made herein. Only examples of functional configurations of the available subframe position information sending unit 1404 and the receiving unit 1406 will be described in detail below.

The available subframe position information sending unit 1404 may be configured to send information indicating a position of a synchronization subframe and a radio frame available for sending the synchronization signal by the source cell to the target cell, so that the target cell determines the synchronization subframe position according to the information from the source cell and its own configuration condition.

The receiving unit 1406 may be configured to receive information indicating the synchronization subframe position from the target cell.

Figure 15:
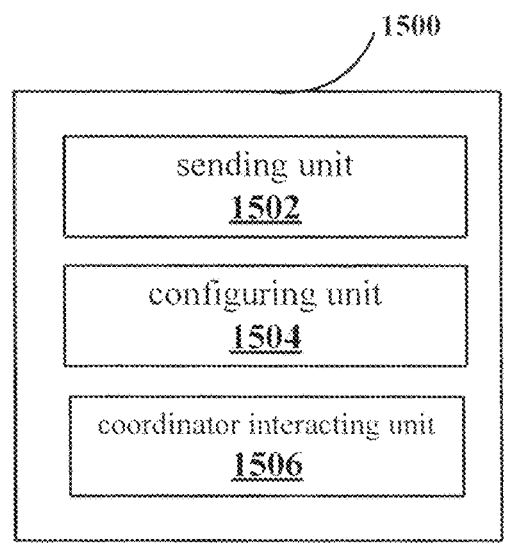
FIG. 15 is a block diagram illustrating an example of functional configuration of a device in a wireless communication system according to another embodiment of the disclosure.

FIG. 15 is a block diagram illustrating an example of functional configuration of a device in a wireless communication system according to another embodiment of the disclosure.

As shown in FIG. 15, a device 1500 may include a sending unit 1502, a configuring unit 1504 and a coordinator interacting unit 1506. Functional configurations of the sending unit 1502 and the configuring unit 1504 are the same as that of the sending unit 1202 and the configuring unit 1204 described with reference to FIG. 12 above, and no repeated description will be made herein. Only an example of functional configuration of the coordinator interacting unit 1506 will be described in detail below.

The coordinator interacting unit 1506 may be configured to send information about the source cell to a coordinator within a cell cluster to which the source cell belongs so as to perform information interaction with a coordinator within a cell cluster to which the target cell belongs via this coordinator, and to receive instruction regarding synchronization procedure from the coordinator within the cluster cell to which the source cell belongs.

Next, an example of functional configuration of a device on target cell side will be described with reference to FIG. 16 and FIG. 17.

Figure 16:
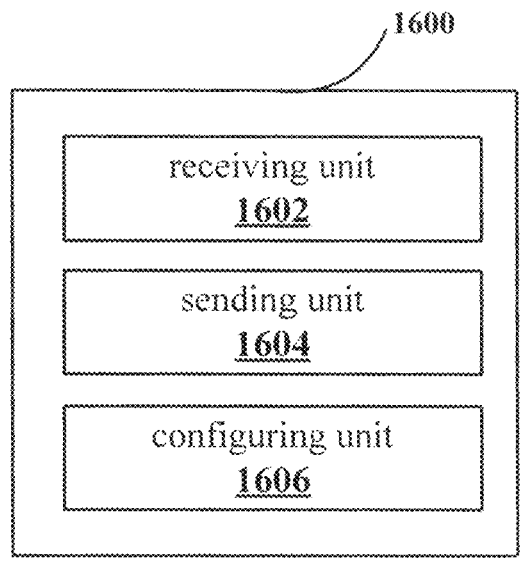
FIG. 16 is a block diagram illustrating an example of functional configuration of a device in a wireless communication system according to an embodiment of the disclosure.

FIG. 16 is a block diagram illustrating an example of functional configuration of a device in a wireless communication system according to an embodiment of the disclosure.

As shown in FIG. 16, a device 1600 may include a receiving unit 1602, a sending unit 1604 and a configuring unit 1606.

The receiving unit 1602 may be configured to receive information indicating a position of a synchronization subframe and a radio frame having been used for sending a synchronization signal by a source cell from the source cell.

The sending unit 1604 may be configured to send feedback information to the source cell according to the received information and configuration condition of a target cell where the device 1600 locates, so as to determine a synchronization subframe position configurable for both the source cell and the target cell. It is to be understood that as described above, the synchronization subframe position may be determined by the source cell or the target cell.

Preferably, in a case that the synchronization subframe position is determined by the source cell, the sending unit 1604 may be further configured to send information indicating a subframe position available for the target cell to the source cell, so that the source cell determines the synchronization subframe position according to the information and its own configuration condition. At this time, the receiving unit 1602 may be further configured to receive information indicating the synchronization subframe position from the source cell.

On the other hand, in a case that the synchronization subframe position is determined by the target cell, the receiving unit 1602 may be further configured to receive information indicating a position of a synchronization subframe and a radio frame available for the source cell from the source cell. In this case, the device 1600 may further include a synchronization subframe position determining unit configured to determine the synchronization subframe position according to the information from the source cell and the configuration condition of the target cell.

Preferably, the synchronization subframe position determining unit may be further configured to determine the synchronization subframe position in the following way:

(a) if the position of the synchronization subframe and the radio frame having been used for sending the synchronization signal by the source cell is available in the target cell, then determining this position as the synchronization subframe position;

(b) in a case that (a) does not hold true, if a special subframe in the radio frame having been used for sending the synchronization signal by the source cell is available, then determining a position of the special subframe as the synchronization subframe position;

(c) in a case that (a) and (b) do not hold true, randomly selecting one from subframe positions available for both the source cell and the target cell as the synchronization subframe position; and (d) if there exists no synchronization subframe position configurable for both the source cell and the target cell in the radio frame having been used for sending the synchronization signal by the source cell, then repeating operations in (a) to (c) to continue searching in next radio frame At this time, the sending unit 1604 is further configured to send the information indicating the synchronization subframe position to the source cell.

The configuring unit 1606 may be configured to configure the target cell according to the synchronization subframe position to listen to the synchronization signal from the source cell so as to synchronize with the source cell.

Specifically, the configuring unit 1606 may be further configured to configure a MBSFN subframe (that is, MBSFN listening) at the synchronization subframe position of the target cell to listen to the synchronization signal from the source cell if the synchronization subframe position is not a special subframe position, otherwise configure a special subframe at the synchronization subframe position of the target cell as having a longer guard period than that of a special subframe at the synchronization subframe position of the source cell so as to listen to the synchronization signal from the source cell.

Figure 17:
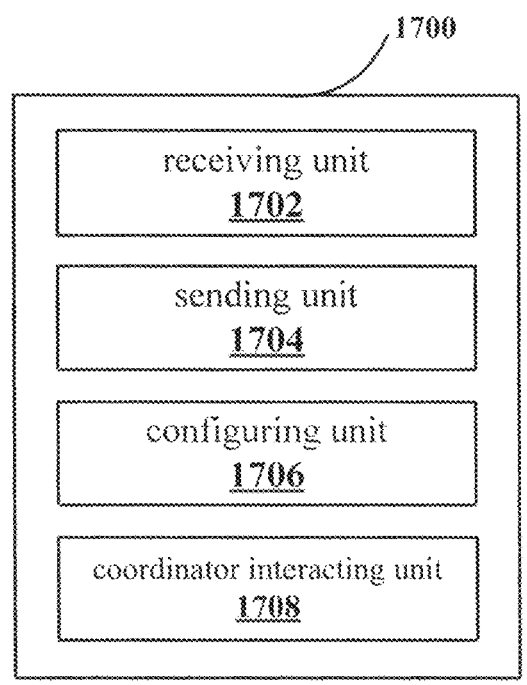
FIG. 17 is a block diagram illustrating an example of functional configuration of a device in a wireless communication system according to another embodiment of the disclosure.

FIG. 17 is a block diagram illustrating an example of functional configuration of a device in a wireless communication system according to another embodiment of the disclosure.

As shown in FIG. 17, a device 1700 may include a receiving unit 1702, a sending unit 1704, a configuring unit 1706 and a coordinator interacting unit 1708. Functional configurations of the receiving unit 1702, the sending unit 1704 and the configuring unit 1706 are the same as that of the receiving unit 1602, the sending unit 1604 and the configuring unit 1606 described with reference to FIG. 16 above, and no repeated description will be made herein. Only an example of functional configuration of the coordinator interacting unit 1708 will be described in detail below.

The coordinator interacting unit 1708 may be configured to send information about the target cell to a coordinator within a cell cluster to which the target cell belongs so as to perform information interaction with a coordinator within a cell cluster to which the source cell belongs via this coordinator, and to receive instruction regarding synchronization procedure form the coordinator within the cluster cell to which the target cell belongs.

It is to be understood that the functional configurations of the devices on the source cell side and the target cell side described above with reference to FIG. 12 to FIG. 17 are only examples but not limitation, and those skilled in the art may add, delete and/or combine the above units according to the principle of the disclosure, and such variations should be considered as falling within the substantive scope of the disclosure. Further, the contents which are not described in detail when describing the device embodiment may be referred to description at corresponding positions in the method embodiments, and no repeated description will be made herein.

Further, the embodiment of the disclosure further provides an electronic apparatus located in a wireless communication system and including a circuit configured to perform the following operations: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position.

Further, the embodiment of the disclosure further provides an electronic apparatus located on source cell side in a wireless communication system and including a circuit configured to perform the following operations: sending information indicating a position of a synchronization subframe and a radio frame having been used for sending a synchronization signal by a source cell where the device locates to a target cell, so as to determine a synchronization subframe position configurable for both the source cell and the target cell; and configuring the source cell according to the synchronization subframe position to send a synchronization signal, thereby synchronizing with the target cell, in which the target cell performs synchronization with the source cell being a synchronization source.

Further, the embodiment of the disclosure further provides an electronic apparatus located on target cell side in a wireless communication system and including a circuit configured to perform the following operations: receiving information indicating a position of a synchronization subframe and a radio frame having been used for sending a synchronization signal by a source cell from the source cell; sending feedback information to the source cell according to the received information and configuration condition of a target cell where the device locates, so as to determine a synchronization subframe position configurable for both the source cell and the target cell; and configuring the target cell according to the synchronization subframe position to listen to the synchronization signal from the source cell, thereby synchronizing with the source cell.

Further, the embodiment of the disclosure further provides a storage medium including machine readable program codes which when executed on an information processing apparatus, cause the information processing apparatus to perform the following steps: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position.

Further, the embodiment of the disclosure further provides a program product including machine executable instructions which when executed on an information processing apparatus, cause the information processing apparatus to perform the following steps: a cell information interacting step of interacting information about a first cell and a second cell having interference with each other between the first cell and the second cell to determine a source cell and a target cell among the first cell and the second cell, wherein the target cell performs synchronization with the source cell being a synchronization source; an initial synchronizing step of performing initial frame-level synchronization by the target cell with the source cell being the synchronization source; a synchronization information interacting step of interacting information about a synchronization subframe position between the source cell and the target cell to determine a synchronization subframe position configurable for both the source cell and the target cell; and a symbol-level synchronizing step of performing symbol-level synchronization between the source cell and the target cell according to the determined synchronization subframe position.

Accordingly, a storage medium on which the above program product storing machine executable instructions is carried is also included in the disclosure of the invention. The storage medium includes but not limited to a floppy disk, an optical disk, a magneto-optical disk, a storage card, a memory rod and the like.

Furthermore, it shall be noted that the foregoing series of processes and apparatuses can also be embodied in software and/or firmware. In the case of being embodied in software and/or firmware, a program constituting the software is installed from a storage medium or a network to a computer with a dedicated hardware structure, e.g., a general purpose personal computer 1800 illustrated in FIG. 18, which can perform various functions when various programs are installed thereon.

Figure 18:
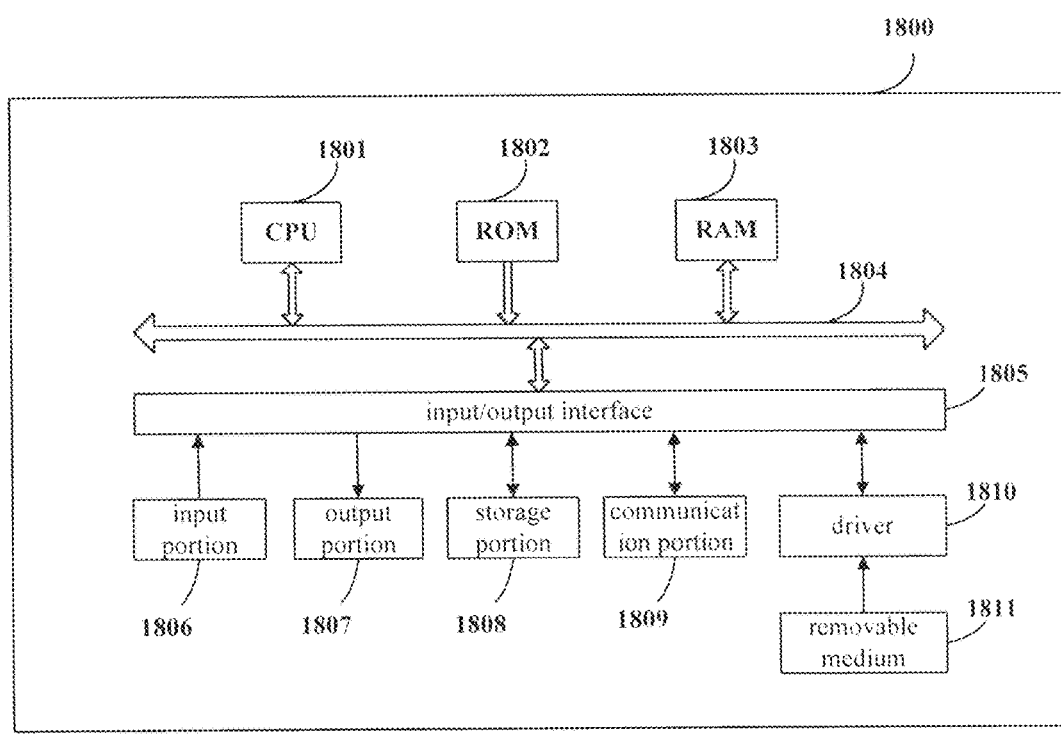
FIG. 18 is a block diagram illustrating an exemplary structure of a personal computer as an information processing apparatus that may be used in an embodiment of the disclosure.

In FIG. 18, a Central Processing Unit (CPU) 1801 performs various processes according to a program stored in a Read Only Memory (ROM) 1802 or loaded from a storage portion 1808 into a Random Access Memory (RAM) 1803 in which data required when the CPU 1801 performs the various processes is also stored as needed.

The CPU 1801, the ROM 1802 and the RAM 1803 are connected to each other via a bus 1804 to which an input/output interface 1805 is also connected.

The following components are connected to the input/output interface 1805: an input portion 1806 including a keyboard, a mouse, etc.; an output portion 1807 including a display, e.g., a Cathode Ray Tube (CRT), a Liquid Crystal Display (LCD), etc., a speaker, etc.; a storage portion 1808 including a hard disk, etc.; and a communication portion 1809 including a network interface card, e.g., an LAN card, a modem, etc. The communication portion 1809 performs a communication process over a network, e.g., the Internet.

A driver 1810 is also connected to the input/output interface 1805 as needed. A removable medium 1811, e.g., a magnetic disk, an optical disk, an magneto optical disk, a semiconductor memory, etc., can be installed on the driver 1810 as needed so that a computer program fetched therefrom can be installed into the storage portion 1808 as needed.

In the case that the foregoing series of processes are performed in software, a program constituting the software is installed from a network, e.g., the Internet, etc., or a storage medium, e.g., the removable medium 1811, etc.

Those skilled in the art shall appreciate that such a storage medium will not be limited to the removable medium 1811 illustrated in FIG. 18 in which the program is stored and which is distributed separately from the device to provide a user with the program. Examples of the removable medium 1811 include a magnetic disk (including a Floppy Disk (a registered trademark)), an optical disk (including Compact Disk-Read Only memory (CD-ROM) and a Digital Versatile Disk (DVD)), a magneto optical disk (including a Mini Disk (MD) (a registered trademark)) and a semiconductor memory. Alternatively the storage medium can be the ROM 1802, a hard disk included in the storage portion 1808, etc., in which the program is stored and which is distributed together with the apparatus including the same to the user.

It shall further be noted that the steps of the foregoing series of processes may naturally but not necessarily be performed in the sequential order as described chronically. Some of the steps may be performed concurrently or separately from each other.

Although the disclosure and the advantages thereof have been described in details, it shall be appreciated that various modifications, substitutions and variations can be made without departing from the spirit and scope of the disclosure as defined by the appended claims. Furthermore the terms "include", "comprise" or any variants thereof in the embodiments of the disclosure are intended to encompass nonexclusive inclusion so that a process, method, article or apparatus including a series of elements includes both those elements and one or more other elements which are listed explicitly or an element(s) inherent to the process, method, article or device. Without much more limitation, an element being defined by a sentence "include/comprise a(n) . . . " will not exclude presence of an additional identical element(s) in the process, method, article or device including the element.

The invention claimed is:

1. A method in a wireless communication system, the method comprising:
   a cell information interacting operation of interacting information about a first cell and a second cell having interference with each other between the first cell and the second cell to determine a source cell and a target cell among the first cell and the second cell, wherein the target cell performs synchronization with the source cell being a synchronization source;
   an initial synchronizing operation of performing initial frame-level synchronization by the target cell with the source cell being the synchronization source;
   a synchronization information interacting operation of interacting information regarding a synchronization subframe position between the source cell and the target cell to determine a usable synchronization subframe position configurable for both the source cell and the target cell; and
   a symbol-level synchronizing operation of performing symbol-level synchronization between the source cell and the target cell according to the determined usable synchronization subframe position,
   wherein the information interacted in the cell information interacting operation comprises information about stratum levels of the first cell and the second cell,
   wherein the source cell is a cell having a lower stratum level among the first cell and the second cell, and
   wherein the first cell corresponds to a first cell cluster associated with a first operator and the second cell corresponds to a second cell cluster associated with a second operator different from the first operator.

2. The method according to claim 1, wherein in the symbol-level synchronizing operation, synchronization is performed in a special subframe-based manner or in a Multimedia Broadcast Single Frequency Network (MBSFN) subframe-based manner.

3. The method according to claim 2, wherein in a case that the synchronization is performed in the special subframe-based manner, a special subframe at the synchronization subframe position of the target cell is configured as having a longer guard period than that of a special subframe at the synchronization subframe position of the source cell so as to listen to a synchronization signal from the source cell.

4. The method according to claim 2, wherein in a case that the synchronization is performed in the MBSFN subframe-based manner, a MBSFN subframe is configured at the synchronization subframe position of the source cell to transmit a synchronization signal, and a MBSFN subframe is configured at the synchronization subframe position of the target cell to listen to the synchronization signal from the source cell.

5. The method according to claim 4, wherein a MBSFN blank subframe is configured at the synchronization subframe position of a neighboring cell at the same frequency range as the target cell in a cell cluster to which the target cell belongs.

6. The method according to claim 1, wherein information about the synchronization subframe position interacted between the source cell and the target cell is included in a system information block of a physical downlink sharing channel.

7. The method according to claim 1, wherein the lower stratum level is defined according to if the source cell is a cell having a smaller number of neighboring cells among the first cell and the second cell; or the source cell is a cell starting up earlier among the first cell and the second cell.

8. The method according to claim 1, wherein the first cell and the second cell use the same TDD configuration.

9. A device in a wireless communication system, the device comprising:
   circuitry configured to:
   send information indicating a position of a synchronization subframe and a radio frame having been used for sending a synchronization signal by a source cell where the device locates to a target cell, so as to determine a usable synchronization subframe position configurable for both the source cell and the target cell; and
   configure the source cell according to the usable synchronization subframe position to send a synchronization signal, thereby synchronizing with the target cell,
   wherein the target cell performs synchronization with the source cell being a synchronization source, and
   wherein the first cell corresponds to a first cell cluster associated with a first operator and the second cell corresponds to a second cell cluster associated with a second operator different from the first operator.

10. The device according to claim 9, wherein the circuitry is configured to:
    receive feedback information indicating a subframe position available for the target cell from the target cell; and
    determine the usable synchronization subframe position configurable for both the source cell and the target cell according to the feedback information and configuration condition of the source cell.

11. The device according to claim 10, wherein the circuitry is configured to determine the usable synchronization subframe position in the following way:
    (a) when the position of the synchronization subframe and the radio frame having been used for sending the synchronization signal by the source cell is available in the target cell, then determining this position as the usable synchronization subframe position;
    (b) in a case that (a) does not hold true, when there exists another subframe used for sending a synchronization signal in the radio frame having been used for sending the synchronization signal by the source cell while a position of this subframe is available in the target cell, then determining the position of this subframe as the usable synchronization subframe position;
    (c) in a case that (a) and (b) do not hold true, when a special subframe in the radio frame having been used for sending the synchronization signal by the source cell is available, then determining a position of the special subframe as the usable synchronization subframe position;
    (d) in a case that (a), (b) and (c) do not hold true, randomly selecting one from subframe positions available for both the source cell and the target cell as the usable synchronization subframe position; and
    (e) when there exists no usable synchronization subframe position configurable for both the source cell and the target cell in the radio frame having been used for sending the synchronization signal by the source cell, then repeating operations in (a) to (d) to continue searching in next radio frame.

12. The device according to claim 9, wherein the circuitry is configured to:

send information indicating the position of the synchronization subframe and the radio frame available for sending the synchronization signal by the source cell to the target cell, so that the target cell determines the usable synchronization subframe position according to the information from the source cell and its own configuration condition; and receive information indicating the usable synchronization subframe position from the target cell.

13. The device according to claim 11, wherein the circuitry is configured to configure a Multimedia Broadcast Single Frequency Network (MBSFN) subframe at the synchronization subframe position of the source cell to transmit the synchronization signal when the synchronization subframe position is not a special subframe position, otherwise configure a special subframe at the synchronization subframe position of the source cell as having a shorter guard period than that of a special subframe at the synchronization subframe position of the target cell.

14. The device according to claim 9, wherein the circuitry is configured to:

send information about the source cell to a coordinator within a cell cluster to which the source cell belongs so as to perform information interaction with a coordinator within a cell cluster to which the target cell belongs via this coordinator, and receive instruction regarding synchronization procedure from the coordinator within the cluster cell to which the source cell belongs.

15. A device in a wireless communication system, the device comprising:

circuitry configured to:

receive information indicating a position of a synchronization subframe and a radio frame having been used for sending a synchronization signal by a source cell from the source cell;

send feedback information to the source cell according to the received information and configuration condition of a target cell where the device locates, so as to determine a usable synchronization subframe position configurable for both the source cell and the target cell; and configure the target cell according to the usable synchronization subframe position to listen to the synchronization signal from the source cell, thereby synchronizing with the source cell, and wherein the first cell corresponds to a first cell cluster associated with a first operator and the second cell corresponds to a second cell cluster associated with a second operator different from the first operator.

16. The device according to claim 15, wherein the circuitry is configured to:

send information indicating a subframe position available for the target cell to the source cell, so that the source cell determines the usable synchronization subframe position according to the information and its own configuration condition, and receive information indicating the usable synchronization subframe position from the source cell.

17. The device according to claim 15, wherein the circuitry is configured to:

receive information indicating the position of the synchronization subframe and the radio frame available for the source cell from the source cell, determine the usable synchronization subframe position according to the information from the source cell and configuration condition of the target cell, and send information indicating the usable synchronization subframe position to the source cell.

18. The device according to claim 17, wherein the circuitry is configured to determine the usable synchronization subframe position in the following way:

(a) when the position of the synchronization subframe and the radio frame having been used for sending the synchronization signal by the source cell is available in the target cell, then determining this position as the usable synchronization subframe position;

(b) in a case that (a) does not hold true, when a special subframe in the radio frame having been used for sending the synchronization signal by the source cell is available, then determining a position of the special subframe as the usable synchronization subframe position;

(c) in a case that (a) and (b) do not hold true, randomly selecting one from subframe positions available for both the source cell and the target cell as the usable synchronization subframe position; and (d) when there exists no usable synchronization subframe position configurable for both the source cell and the target cell in the radio frame having been used for sending the synchronization signal by the source cell, then repeating operations in (a) to (c) to continue searching in next radio frame.

19. The device according to claim 15, wherein the circuitry is configured to configure a Multimedia Broadcast Single Frequency Network (MBSFN) subframe at the synchronization subframe position of the target cell to listen to the synchronization signal from the source cell when the synchronization subframe position is not a special subframe position, otherwise configure a special subframe at the synchronization subframe position of the target cell as having a longer guard period than that of a special subframe at the synchronization subframe position of the source cell so as to listen to the synchronization signal from the source cell.

20. The device according to claim 15, wherein the circuitry is configured to:

send information about the target cell to a coordinator within a cell cluster to which the target cell belongs so as to perform information interaction with a coordinator within a cell cluster to which the source cell belongs via this coordinator, and receive instruction regarding synchronization procedure form the coordinator within the cluster cell to which the target cell belongs.

* * * * *